United States Patent [19]

Salvetat et al.

[11] Patent Number: 5,723,566
[45] Date of Patent: Mar. 3, 1998

[54] RESINOUS COPOLYMER COMPRISING MONOMER UNITS OF EACH OF THE GROUPS OF PHENOL COMPOUNDS AND OLEFINICALLY UNSATURATED NON-ACIDIC TERPENE COMPOUNDS

[75] Inventors: Jacques Salvetat, Villeneuve, France; Ronald Wind, Emmen, Netherlands

[73] Assignee: Arizona Chemical S.A., Niort, France

[21] Appl. No.: 513,413

[22] Filed: Aug. 10, 1995

[30] Foreign Application Priority Data

Feb. 11, 1993 [EP] European Pat. Off. ............. 93400341

[51] Int. Cl.$^6$ .................. C08G 61/00; C08F 236/00; C08F 236/04
[52] U.S. Cl. ............................................ 528/205
[58] Field of Search .................................. 528/205

[56] References Cited

U.S. PATENT DOCUMENTS

| | | | |
|---|---|---|---|
| 2,343,845 | 3/1944 | Powers | 528/205 |
| 2,606,886 | 8/1952 | Amberg | 524/326 |
| 3,383,362 | 5/1968 | Gonzenbach | |
| 3,944,523 | 3/1976 | Gobran | 156/333 |
| 4,056,513 | 11/1977 | Lahourcade et al. | 528/205 |
| 4,105,610 | 8/1978 | Jung et al. | |
| 4,701,517 | 10/1987 | Daughenbaugh, Jr. | 528/205 |
| 5,164,357 | 11/1992 | Bartman et al. | 503/209 |

FOREIGN PATENT DOCUMENTS

| | | |
|---|---|---|
| 2209779 | 7/1974 | France. |
| 1043159 | 9/1966 | United Kingdom. |

*Primary Examiner*—Jeffrey Mullis
*Attorney, Agent, or Firm*—Luedeka, Neely & Graham

[57] ABSTRACT

The present invention relates to a resinous copolymer comprising monomer units of each of the groups of phenol compounds (I) and olefinically unsaturated non-acidic terpene compounds (II), characterized in that the copolymer contains monomer units from the group of polyunsaturated olefin compound (III), the monomer units of compound (III) being 1 to 70% by weight of the total of the monomer units of compounds (II) and (III), the monomer units of compounds (II) and (III) being at least 50% by weight of the total of the monomer units of compounds (I), (II) and (III). The melting point of the copolymer is at least 130° C.

The copolymers can be used in printink inks.

8 Claims, No Drawings

RESINOUS COPOLYMER COMPRISING MONOMER UNITS OF EACH OF THE GROUPS OF PHENOL COMPOUNDS AND OLEFINICALLY UNSATURATED NON-ACIDIC TERPENE COMPOUNDS

The invention relates to a resinous copolymer comprising monomer units of each of the groups of phenol compounds (I) and olefinically unsaturated non-acidic terpene compounds (II).

Such resinous copolymers (so-called terpene-phenolic resins) are disclosed in SU-A-1073249. A drawback of said terpene-phenolic resins is their relatively low melting point of at most 120° C. Consequently these terpene-phenolic resins are not suitable for use in printing inks applications, for which a higher melting point, particularly for rapid drying of the ink, is desirable. A further drawback is their relatively insensitivety to modification reactions. In printing ink applications modifiability is desirable for adapting certain properties of the resinous copolymer to the desired properties of the printing ink such as, for example, the viscosity, the solubility and the pigment-wetting properties.

The object of the invention is to provide a resinous copolymer comprising monomer units of each of the groups of phenol compounds (I) and olefinically unsaturated non-acidic terpene compounds (II) for use in printing inks.

This copolymer according to the invention is characterized in that the copolymer also contains monomer units from the group of polyunsaturated olefin compounds (III), the monomer units of compound (III) being 1 to 70% by weight of the total of the monomer units of compounds (II) and (III), and the monomer units of compounds (II) and (III) being at least 50% by weight of the total of the monomer units of compound (I), (II) and (III).

Preferably the melting point of the copolymer is at least 130° C.

More preferably, the melting point is at least 140° C.

The term "melting point" refers to the "ring and ball" softening point (according to ASTM E28).

The Japanese patent application 47035000 discloses that resinous copolymers consisting of monomer units of compounds (I) and (III) have a much lower melting point than the above-mentioned terpene-phenolic resins consisting of monomer units of compounds (I) and (II). Surprisingly, the presence of the monomer units of compound (III) in addition to monomer units of compounds (I) and (II) results in a higher melting point of the resinous copolymer.

A further advantage of the resinous copolymers according to the invention is that now use can be made of terpene compound (II) which would result in a relatively low melting point when used in the corresponding terpene-phenolic resin for this application. Terpene compounds resulting in resins having a relatively low melting point are generally more readily available and cheaper.

Another advantage of the resinous copolymer according to the invention is the very good modifiability.

The resinous copolymers according to the invention further have also a very good solubility in aromatic-free mineral oils and good wetting behaviour towards pigments. The resinous copolymers are also very stable towards oxydation which does not decrease the solubility in mineral oils. Furthermore they show good drying properties. As a result of these properties, the resinous copolymers are in particular very suitable for use in printing inks.

If the amount of the monomer units of compound (III) is 5 to 50% by weight of the monomer units of compounds (II) and (III) higher melting points and better solubility in aromatic-free mineral oils, can be obtained.

Preferably, the resinous copolymer according to the invention contains 5–50% by weight of monomer units of compound (I), 15–80% by weight of monomer units of compound (II) and 0.5–50% by weight of monomer units of compound (III), based on the total weight of the monomer units of compounds (I), (II) and (III).

More preferably the resinous copolymer according to the invention contains 10–40% by weight of monomer units of compound (I), 30–80% by weight of monomer units of compound (II) and 5–30% by weight of monomer units of compound (III), based on the total weight of the monomer units of compounds (I), (II) and (III).

A content of more than 10% by weight of monomer units of compound (I) results in good pigment wetting and a good start of the polymerization reaction. If the content is more than 40% by weight, lower melting points and lower solubility in aromatic-free solvents are achieved. A content of at least 30% by weight of monomer units of compound (II) is important for a high melting point, a good solubility, even in aromatic-free solvents, and a high drying rate.

More preferably, the content of monomer units of compound (II) is at least 40% by weight.

Preferably, the resinous copolymer has at least 5% by weight of monomer units of compounds (III), in order to achieve a higher melting point and good modifiability. More preferably, said content is at least 10% by weight. A resinous copolymer with a monomer compound (III) content in excess of 30% has lower solubility in aromatic-free mineral oils.

Suitable phenol compounds (I) include mono- or polyhydric, mono- or polynuclear, substituted or unsubstituted phenol compounds such as for example phenol, mono-, di- or trialkyl- or alkoxyphenols, the alkyl or alkoxy groups having 1–12 carbon atoms, chlorinated phenols, thiophenols or mixtures of said phenol compounds.

Preferably, the phenol compound (I) is phenol or an alkylphenol having 1–12 carbon atoms. Preferably the alkylphenol is butyl-, octyl- or nonylphenol.

Preferably, the olefinically unsaturated non-acidic terpene compound (II) comprises 5 to 40, and more preferably 5 to 20, carbon atoms.

The monomer units of compound (II) may be pure substances or mixtures of various olefinically unsaturated non-acidic terpene compounds.

Preferably the monomer units of compound (II) have a high content of cyclic olefinically unsaturated non-acidic terpene compounds. The monomer units of compound (II) in the resinous copolymer preferably comprise at least 80% by weight, and more preferably at least 90% by weight, of cyclic olefinically unsaturated non-acidic terpene compounds.

Suitable olefinically unsaturated non-acidic terpene compounds, as the pure monomer units of compound (II) or as a component in a mixture of monomer units of compounds (II) include alpha-pinene, beta-pinene, sabinene, limonene, carene and dipentene. Preferably compound (II) is alpha-pinene.

The mixtures used in practice may be industrial grades or concentrates which mainly comprise monomer units of compound (II). Said mixtures may be distillates or extracts of natural raw materials such as, for example, of natural resins. Good results can be achieved with turpentines which are mixtures of alpha- and beta-pinene and other terpenes. Preferably, turpentines having a high alpha-pinene content are used.

Preferably, the polyunsaturated olefin compounds (III) have 4–20 carbon atoms. They must have one or more cationically polymerizable unsaturated bonds and one or more unsaturated bonds which can be reacted non-cationically under the conditions of the polymerization reaction. As a result, the resinous copolymer is partially unsaturated after the reaction of the monomer units of compounds (I), (II) and (III).

Suitable polyunsaturated olefin compounds include, cycloaliphatic dienes or trienes such as, for example, dicyclopentadiene (DCPD), cyclopentadiene, cyclooctadiene or cyclohexadiene or non-cyclic aliphatic dienes or trienes, whose double bonds are preferably conjugated, such as, inter alia, butadiene, piperylene or 1,3-octadiene. Preferably, doubly unsaturated olefin compounds are used.

The polyunsaturated olefin compound (III) may be a pure substance or a mixture of various monomer compounds (III).

Suitable high melting points, can be achieved if in the resinous copolymer the monomer compound (III) comprise at least 60% by weight, more preferably at least 80% by weight, of cyclic polyunsaturated olefin compounds. Preferably the cyclic polyunsaturated olefin compound is dicyclopentadiene.

Good results are achieved in particular if at least 80% by weight, or more preferably at least 90% by weight, of both the non-acidic terpene compound (II) and the polyunsaturated olefin compound (III) are cyclic compounds. Preferably, said compounds are alpha-pinene and dicyclopentadiene.

The resinous copolymer can be prepared by cationic polymerization, being used using a Lewis acid being used catalyst. Suitable catalysts include for example $BF_3$, $BCl_3$ and complexes of $BF_3$ with, for example, water, alkyl alcohols, phenols or ethers. Preferably $BF_3$ is used.

The resinous copolymer according to the invention can also be prepared by other methods.

For example, the monomer compounds can first be blended together, after which the catalyst is added in small amounts with stirring. This method is particularly suitable if relatively small amounts of phenol compound (I) have to be incorporated.

Preferably the resinous copolymer is prepared according to a "reverse" cationic polymerization in a solvent. "Reverse" means that, in contrast to the method described above, an activated complex is first formed between the catalyst and the phenol compounds (I), after which the remaining monomer units are added. This method makes it possible to incorporate higher proportions of phenol compounds. Both methods can be applied with or without a solvent. By using a solvent, the reaction can proceed at lower temperatures.

The solvent may be an alkylatable solvent or a solvent which is inert with regard to the polymerization reaction.

An alkylatable solvent consists wholly or partially of aromatic substances which may be incorporated in small amounts into the resinous copolymer during the polymerization reaction. Suitable alkylatable solvents include toluene, xylene, trimethylbenzene (which compounds may or may not be substituted by aliphatic molecules) and mixtures of such compounds with a compound which is inert with regard to the polymerization reaction. An advantage of these aromatic groups containing solvents is the better solubility of the reactants and the reaction products, as a result of which a more homogeneous reaction mixture is obtained. The aromatic alkylating compounds from the solvent which are incorporated in the resinous copolymer have a positive influence on the solubility of the resinous copolymer in aromatic-containing solvents.

Preferably, the solvent is a compound, or a mixture of compounds being inert with regard to the polymerization reaction. Especially in conjunction with a low reaction temperature, they result in very high melting points and in products which are readily soluble in substantially aromatic-free mineral solvents.

Suitable inert solvents include aliphatic compounds which may be chlorinated. Preferably, the solvent is an alkane and more preferably an alkane having 5 to 10 carbon atoms, such as for example heptane. In many cases, in particular at a low reaction temperature, it is preferred to combine the advantages of both the alkylating solvents and the inert compounds by using a mixture of them.

A further advantage of a "reverse" cationic polymerization in an inert solvent is that the copolymer composition is substantially completely stoichiometrically defined by the choice of the proportions of the monomers employed.

The reaction temperature is preferably below 60° C. and more preferably below 40° C. At these temperatures alkylating solvents can be used, even if good solubility in aromatic-free solvents is required. At low reaction temperatures only small amounts of the alkylatable compounds from the solvents are incorporated in the resinous copolymer.

In addition to the monomers (I), (II) and (III), the resinous copolymers according to the invention optionally may also contain minor amounts, preferably 0.5-30% by weight, more preferably 0.5-15% by weight, and most preferably 0.5-5% by weight, of other non-acidic copolymerizable monomers, such as, for example, vinyl aromatics or alkenes. Said monomers may be added before, during or after the polymerization reaction of the monomers (I), (II) and (III).

For use in printing inks the amount of vinyl aromatic units is preferably less than 15% by weight, preferably less than 10% by weight, and more preferably less than 5% by weight. These amount results in a good solubility of the resin in the ink and effective drying of the ink.

After the polymerization reaction and neutralization of the catalyst, the resinous copolymer is isolated from the reaction product and purified, by generally known methods.

Generally the weight average molecular weight (Mw) of the base resin is at most 1500.

By modification of the base resin with other compounds it is possible to adjust particular properties of the resinous copolymer to the requirements of particular applications.

The resinous copolymer comprising monomer units of compounds (I), (II) and (III) can be modified with at most 50% by weight, and more preferably at most 30% by weight (based on the total copolymer weight), of ether compounds. The modification can take place before or after the above-mentioned reaction product is upgraded to yield the resinous copolymer.

The resinous copolymer can be modified with, for example an unsaturated carboxylic acid, such as for example unsaturated monocarboxylic acids, unsaturated dicarboxylic acids or unsaturated carboxylic acid anhydrides. Preferably, carboxylic acid anhydride and in particular maleic anhydride are used.

In another preferred embodiment of the invention the carboxylic acid groups of the above-mentioned modified resinous copolymer have been also wholly or partially esterified with alcohols, and/or have been modified by salt formation.

In yet another embodiment of the invention the resinous copolymer, which may or may not have been modified in the above-mentioned way, is further modified by condensation with formaldehyde or with a precondensed phenol-formaldehyde resin.

The weight-average molecular weight also increases concomitantly. The weight-average molecular weight is measured by means of Gel Permeation Chromatography (GPC) according to the SAM-5019 method.

The resinous copolymer according to the invention having a melting point of at least 130° C. also includes said modified copolymers having a melting point of at least 130° C.

The resinous copolymer according to the invention consists of a skeleton of non-acidic monomer units of compounds (I), (II), (III), which have been linked together in one polymerization step, and optionally a minor amount of copolymerizable non-acidic monomer compounds to which, in a second reaction step, other compounds such as, in particular, acidic monomer compounds are reacted.

The resinous copolymers according to the invention are excellently suitable for use in printing inks. Resinous copolymers according to the invention have a high melting point, good wetting behaviour with regard to pigments, good solubility even in aromatic-free solvents, good oxidation resistance and a high drying rate.

The solubility of the resinous copolymers can be expressed by the cloud point. The cloud point is the maximum temperature at which, at a certain content, the resinous copolymer is still just soluble in a solvent. A low cloud point corresponds to good solubility. The base resin preferably has a cloud point, at a content of 10% by weight in an aromatic-free mineral oil (Haltermann PKWF 6/9 AF), of at most 100° C., and more preferably of at most 75° C. The cloud point measurements are carried out using a DSM Chemotronic cloud point meter (10% by weight of a solution of the resinous copolymer being heated to 230° C. and then gradually being cooled down. At the temperature at which the resin is just no longer soluble, the solution becomes cloudy and the trajectory of an IR beam is interrupted thereby).

U.S. Pat. No. 3,383,362 discloses phenol-terpene-cyclic polyolefin polymers having softening points below 123° C. These polymers are for use in ethylene-propylene rubber adhesives. This patent does not give any suggestion to use the polymers in printing ink applications.

GB-B-1043159 discloses terpene phenolic resins having melting points below 109° C. for use as antioxidizing agents for oil of turpentine and, moreover, they are valuable intermediate products. This specification does not give any suggestion to use the resins in printing ink applications.

U.S. Pat. No. 4,105,610 discloses resinous copolymers containing monomer units from the groups (I) and (II) U.S. Pat. No. 4105610 describes a reaction product of a diolefin polymer having a phenol and an olefinically unsaturated carboxylic acid, in which the diolefin polymer may, inter alia, be a copolymer of polyunsaturated diolefins with a minor quantity of a copolymerizable monomer, which monomer may, apart from a large number of other compounds, optionally also be a non-acidic terpene compound. These copolymers have a lower melting point at a comparable molecular weight. U.S. Pat. No. 4,105,610 does not teach that the resinous copolymers according to the present invention, having a relatively high content of non-acidic terpene compounds, will have said high melting points.

EP-A-210706 and EP-A-209956 describe resinous copolymers for use in adhesives and coatings, which largely consist of vinyl aromatic monomer with a minor amount of other copolymerizable monomers, selected from a large group which, inter alia, comprises monomer compounds (I), (II) or (III). Said resinous copolymers have low solubility in aromatic-free mineral oils and dry poorly. A further important drawback of the resinous copolymers according to EP-A-209956 is that they cannot be modified. EP-A-210706 and EP-A-209956 do not provide resinous copolymers having a relatively high melting point.

The invention will hereinafter be explained in more detail by the following non-restrictive examples.

EXAMPLE I

In a double-walled, cooled 1.5 l reactor equipped with stirrer, reflux condenser, thermocouple and gas inlet tube, 520 g of toluene and 200 g of phenol were successively combined. The solution was heated to 35° C., the phenol being dissolved during stirring. After all phenol had dissolved, $BF_3$ gas was fed at a rate of 40 ml a minute, so that a $BF_3$-phenol complex was formed. After the phenol solution was saturated with $BF_3$ (approx. 2500 ml=7.5 g of $BF_3$), the $BF_3$ feed was stopped.

Subsequently, a monomer mixture of 444 g of α-pinene (>95% pure) and 137.2 g of dicyclopentadiene (95% pure) was fed to the complex formed, the feeding rate being such that the average polymerization temperature was 35° C. After addition of the entire monomer mixture, stirring took place for 60 minutes at 35° C. The $BF_3$ was neutralized through addition of 26 g of $Ca(OH)_2$ at 90° C. After filtration, the resin was freed of solvent, oligomers and non-converted monomers by means of vacuum distillation and passing through of nitrogen.

In this way 663 g of resin having the following properties was obtained:
R&B melting point=146° C.,
Mw (with regard to polystyrene)=1100,
Mn (with regard to polystyrene)=680,
cloud point (10%) in aromatic-free mineral oil (Haltermann PKWF 6/9AF)=60° C.
viscosity (50%) in aliphatic mineral oil (Halterman PKWF 6/9 AFN) at 23° C.=44 dPas.

EXAMPLE II

Example I was repeated with a different monomer mixture. In this example a monomer mixture of 238 g of α-pinene (>95% pure) and 297 g of dicyclopentadiene (95% pure) was added to the BF3-phenol complex.

In this way 702 g of resin having the following properties was obtained:
R&B melting point=148° C.,
Mw (with regard to polystyrene)=1135,
Mn (with regard to polystyrene)=620,
cloud point (10%) in aromatic-free mineral oil (Haltermann PKWF 6/9AF)=84° C.

Comparison of Examples I and II shows that the solubility in aromatic-free mineral oil decreases when the content of monomer units (III) exceeds 30%.

Comparative experiment A

Example I was repeated with a different monomer mixture. In this example 574 g of dicyclopentadiene was added to the $BF_3$-phenol complex.

In this way a resin having the following properties was obtained:
R&B melting point<20° C.,
Mw (with regard to polystyrene)=280,
Mn (with regard to polystyrene)=210,
cloud point (10%) in aromatic-free mineral oil (Haltermann PKWF 6/9AF)=<20° C.

Comparative Experiment A shows that a resinous copolymer consisting of monomer units (I) and (III) has a very low melting point.

Comparative experiment B

Example I was repeated with a different composition of the monomer mixture. In this example 581 g of α-pinene (>95% pure) was added to the BF$_3$-phenol complex.

In this way a resin having the following properties was obtained:

R&B melting point=110° C.,

Mw (with regard to polystyrene)=800,

Mn (with regard to polystyrene)=590, cloud point (10%) in aromatic-free mineral oil (Haltermann PKWF 6/9AF)=41° C.

Comparative experiment B shows that a resinous copolymer consisting of monomer units (I) and (II) has a lower melting point than the resinous copolymer according to Example I.

Comparative experiment C

Example I was repeated with a different composition of the monomer mixture. In this example a monomer mixture of 683.1 g of C$_9$ cracker fraction (60–65% cationically polymerizable) and 137.2 g of dicyclopentadiene (95% pure) was added to the BF$_3$-phenol complex.

The C$_9$ cracker fraction substantially consists of aromatic compounds such as for example indene, vinyl toluene, styrene and α-methylstyrene.

In this way 724 g of resin having the following properties was obtained:

R&B melting point=59° C.,

Mw (with regard to polystyrene)=590,

Mn (with regard to polystyrene)=400, cloud point (10%) in aromatic-free mineral oil (Haltermann PKWF 6/9AF)=89° C.

Comparative experiment C shows that when use is made of a C$_9$ fraction in place of the monomer units (II) a very low melting point and low solubility are obtained (in comparison with the resinous copolymer according to Example I).

EXAMPLE III

Example I was repeated with a different composition of the monomer mixture. In this example a monomer mixture of 365.9 g of α-pinene (>95% pure), 78.1 g of paramethylstyrene (99% pure) and 137.2 g of dicyclopentadiene (95% pure) was added to the BF$_3$-phenol complex.

In this way 668 g of a resin having the following properties was obtained:

R&B melting point=145° C.,

Mw (with regard to polystyrene)=1110,

Mn (with regard to polystyrene)=700, cloud point (10%) in aromatic-free mineral oil (Haltermann PKWF 6/9AF)=67° C.

Example III shows that (compared to Comp. experiment C) a higher melting point as well as better solubility can be achieved if the content of vinyl aromatic compounds (78.1 g paramethylene instead of 683.1 g C9-cracker/fraction) is relatively low.

EXAMPLE IV

Example I was repeated with methylcyclohexane as solvent.

In this way 616 g of resin having the following properties was obtained:

R&B melting point=158° C.,

Mw (with regard to polystyrene)=1320,

Mn (with regard to polystyrene)=760, cloud point (10%) in aromatic-free mineral oil (Haltermann PKWF 6/9AF)=47° C.

Example IV shows that both a higher melting point and better solubility are obtained when use is made of a solvent being inert with regard to the polymerization reaction.

EXAMPLE V

Example I was repeated with a mixture of 80 parts by weight of heptane and 20 parts by weight of toluene as solvent.

In this way 638 g of a resin having the following properties was obtained:

R&B melting point=173° C.,

Mw (with regard to polystyrene)=1430,

Mn (with regard to polystyrene)=820, cloud point (10%) in aromatic-free mineral oil (Haltermann PKWF 6/9AF)=52° C.

Example V shows that higher melting points can be obtained in combination with a very small decrease in solubility when use is made of a mixture of an inert and an alkylating mixture as solvent.

EXAMPLE VI

Example I was repeated at a polymerization temperature of 60° C.

In this way 649 g of a resin having the following properties was obtained:

R&B melting point=140° C.,

Mw (with regard to polystyrene)=1320,

Mn (with regard to polystyrene)=650, cloud point (10%) in aromatic-free mineral oil (Haltermann PKWF 6/9AF)=124° C.

Example VI shows that a higher reaction temperature in an alkylating solvent (toluene) results in a decrease in solubility.

Example VII

In a 2 l reactor equipped with stirrer, reflux condenser, thermocouple, inert gas inlet tube and heating jacket, 400 g of the resin from Example I were melted and heated to 220° C. under nitrogen. Subsequently, 56 g of a nonyl phenol formaldehyde adduct were added in 1 hour. The reaction mixture was then stirred for another hour. Next non-reacted materials were removed by means of vacuum distillation while nitrogen was being passed through.

In this way a resin having the following properties was obtained:

R&B melting point=176° C.,

Mw (with regard to polystyrene)=3750,

Mn (with regard to polystyrene)=1030, cloud point (10%) in aromatic-free mineral oil (Haltermann PKWF 6/9AF)=63° C., viscosity (50%) in aliphatic mineral oil (Haltermann PKWF 6/9AFN) at 23° C.=610 dPa.s.

Example VII shows that modification of the resinous copolymer of Example I results in, inter alia, a higher melting point and a strong increase in viscosity.

EXAMPLE VIII

In the reactor described in Example VII, 400 g of the resin from Example I were melted and heated to 200° C. Subsequently, 10 g of maleic anhydride were added, followed by stirring for 2 hours at 200° C. Then, successively, 40 g of epoxidized linseed oil were added, heated to 230° C. and in one hour 80 g of a nonylphenol-formaldehyde adduct were added. This was followed by stirring for 1 hour. The non-reacted components were removed by means of vacuum distillation while nitrogen was being passed through.

In this way a resin having the following properties was obtained:

R&B melting point=186° C.,

Mw (with regard to polystyrene)=47100,

Mn (with regard to polystyrene)=1300, cloud point (10%) in aromatic-free mineral oil (Haltermann PKWF 6/9AF)=164° C., viscosity (45%) in aliphatic mineral oil (Haltermann PKWF 28/31AR) at 23° C.=1300 dPa.s.

EXMAPLE IX

In the reactor described in Example VII, 400 g of the resin from Example I with 100 g of xylene were heated to 145° C. After all resin had dissolved, 20 g of maleic anhydride were added, followed by stirring for 5 minutes. In 30 minutes a 50% solution of di-tertiary butyl peroxide in xylene was added, which was followed by stirring for 120 minutes. The temperature was raised to 200° C., followed by stirring for 120 minutes. The non-reacted components were removed by means of vacuum distillation while nitrogen was being passed through.

In this way a resin having the following properties was obtained:

R&B melting point=168° C., acid number=13 mg KOH/g resin.

EXAMPLE X

In the reactor described in Example VII, 670 g of the resin from Example I were dissolved at 145° C. in 75 g of xylene. Subsequently 213 g of rosin, 50 g of tall-oil fatty acid and 4 g of zinc oxide were added. The solution was cooled down to 100° C. At 100° C. 41.1 g of paraformaldehyde were added and the reaction temperature was raised to 125° C. in 10 minutes. After stirring for 2 hours at 125° C., the reaction temperature was raised to 230° C. in 3 hours. At 230° C. 0.9 g of magnesium oxide were added, followed by stirring for 4 hours. The unreacted components were removed by means of vacuum distillation while nitrogen was being passed through.

In this way a resin having the following properties was obtained:

R&B melting point=196° C., viscosity in toluene at 23° C.=5.5 dPa.s.

We claim:

1. A resinous copolymer comprising monomer units from each of the groups of phenol compounds (I), olefinically unsaturated non-acidic terpene compounds (II), and aliphatic, non-terpenic polyunsaturated olefin compounds (III) wherein the monomer units of compound (III) comprise from about 1 to about 70% by weight of the total weight of the monomer units of compounds (II) and (III), and wherein the monomer units of compounds (II) and (III) are at least about 50% by weight of the total weight of the monomer units of compounds (I), (II) and (III) and the softening point of the copolymer is at least 130° C.

2. The copolymer of claim 1 wherein the monomer units of compound (III) comprise about 5 to about 50% by weight of the total weight of monomer units of compounds (II) and (III).

3. The copolymer of any one of claims 1–2, wherein the copolymer contains from about 10 to about 40% by weight of monomer units of compound (I), from about 30 to about 80% by weight of monomer units of compound (II) and from about 5 to about 30% by weight of monomer units of compound (III), based on the total weight of the monomer units of compounds (I), (II) and (III).

4. The copolymer of any one of claims 1–2 wherein the monomer units of compound (II) comprise at least about 80% by weight cyclic olefinically unsaturated non-acidic terpene compounds.

5. The copolymer of claim 4 wherein the cyclic terpene compound is alpha-pinene.

6. The copolymer of any one of claims 1–2 wherein the monomer units of compound (III) comprise at least about 80% by weight cyclic polyunsaturated olefin units.

7. The copolymer of claim 6 wherein the cyclic polyunsaturated olefin compound is dicyclopentadiene.

8. The copolymer of any one of claims 1–2 wherein the copolymer contains at most about 15% by weight vinyl aromatic monomer.

* * * * *

UNITED STATES PATENT AND TRADEMARK OFFICE
CERTIFICATE OF CORRECTION

PATENT NO. : 5,723,566
DATED : March 3, 1998
INVENTOR(S) : Jacques Salvetat and Ronald Wind It is certified that error appears in the above-indentified patent and that said Letters Patent is hereby corrected as shown below:

Column 6, line 43, change "BF3-phenol" to -- $BF_3$-phenol --

Column 9, line 21, change "EXMAPLE" to -- EXAMPLE --

Signed and Sealed this

Third Day of November, 1998

Attest:

BRUCE LEHMAN

Attesting Officer

Commissioner of Patents and Trademarks